C. STEINBACH.
HARNESS SADDLE.
APPLICATION FILED JUNE 2, 1914.
1,124,181. Patented Jan. 5, 1915.
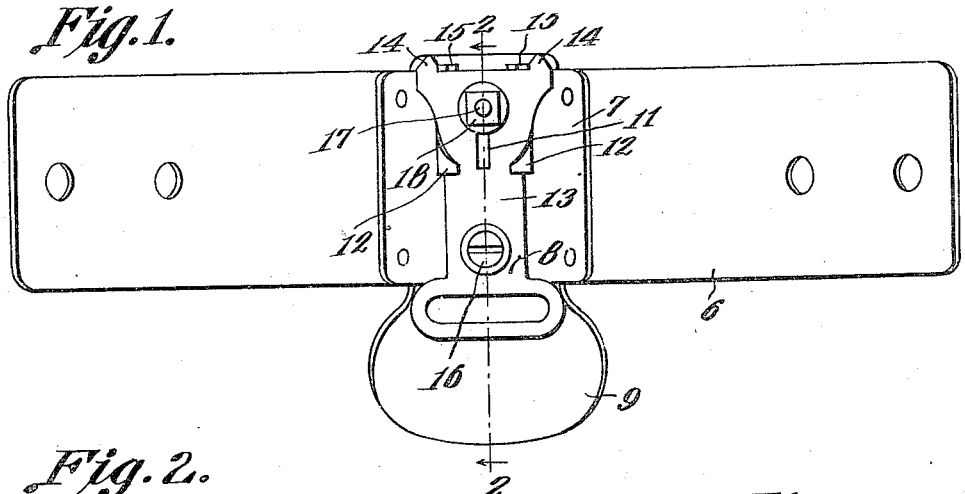
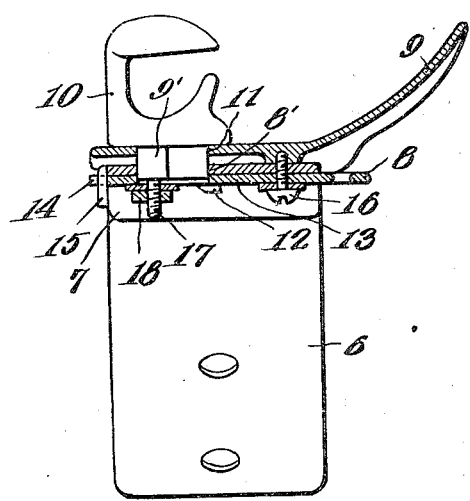
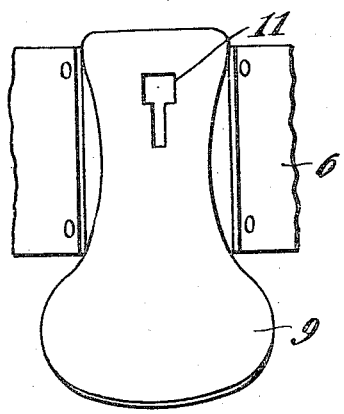
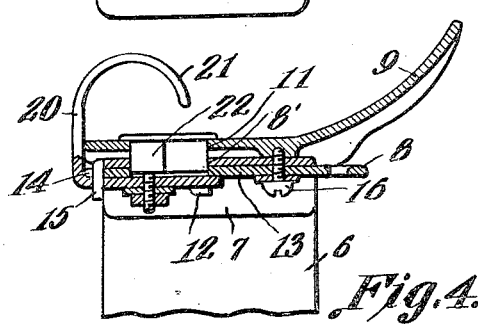
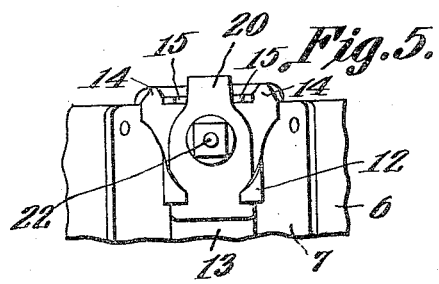
C. Steinbach,
Inventor
Witnesses
by
Attorneys

UNITED STATES PATENT OFFICE.

CHARLES STEINBACH, OF CHELSEA, MICHIGAN, ASSIGNOR OF ONE-HALF TO HENRY A. STEINBACH, OF CHELSEA, MICHIGAN.

HARNESS-SADDLE.

1,124,181.     Specification of Letters Patent.      Patented Jan. 5, 1915.

Application filed June 2, 1914. Serial No. 842,423.

*To all whom it may concern:*

Be it known that I, CHARLES STEINBACH, a citizen of the United States, residing at Chelsea, in the county of Washtenaw and State of Michigan, have invented a new and useful Harness-Saddle, of which the following is a specification.

This invention relates to certain new and useful improvements in harness saddles.

An object of the present invention is to provide a harness saddle in which the crupper loop is rigidly held against shifting and to which crupper loop is secured the check rein hook which is accordingly held in a similar manner.

A further object is to provide the crupper loop with outstanding lugs and spaced ears which coact with the check rein hook and with symmetrically arranged lugs upon the tree yoke rigidly holding the crupper loop and parts connected thereto against shifting and taking the transverse stress off of the bolts or allied securing means.

Another object is to provide the gig tree yoke, and crupper loop with registering and elongated slots through which the check rein hook extends, thus securing the said parts rigidly in position and also preventing the check rein hook from twisting or rotating.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a bottom plan view of my improved harness saddle. Fig. 2 is a cross sectional view taken on the line 2—2 of Fig. 1. Fig. 3 is a plan view of the saddle, parts being removed. Fig. 4 is a view similar to Fig. 2, illustrating a modification, parts being broken away. Fig. 5 is a fragmental bottom view of the parts depicted in Fig. 4.

Referring to the drawings in which similar reference numerals designate corresponding parts throughout the several views, a tree 6 is provided with the central and slightly curved plate 7, to which the crupper loop 8, seat 9, and check rein hook 10 are secured.

The central plate 7 of the tree is provided with the aperture 8′ extending therethrough and which aperture is in the form of two communicating slots and is therefore adapted to receive and maintain in a non-rotatable manner, the shank 9′ of the check rein hook. The seat 9 is of the usual form and includes an aperture 11 similar to and adapted to register with the slot-like aperture 8′ of the central plate of the tree. The crupper loop 8 is constructed and arranged to perform the customary functions and in addition is provided with the overhanging ears 12 intermediate the ends of the shank 13 which forms a part of the crupper loop. The extreme forward end of the shank is provided with the spaced and forwardly extending lugs 14 which coact with and embrace the downwardly extending lugs 15 upon the front extremity of the central plate 7 and which are symmetrically arranged about the median line thereof. The ears 14 and 15 interlock to a certain extent to prevent the transverse shifting of the crupper loop, it being noted that the crupper loop is held in rigid contact with the plate by the set screw 16 or similar means.

The check rein hook is provided with the bolt 17 projecting below the shank 9′ thereof. A securing nut 18 engages the bolt for drawing the check rein hook down into rigid engagement with the seat 9, drawing the seat 9 into forced contact with the central plate 7, and against which latter the crupper loop is also forcibly moved, thus locking the various parts in position.

In some cases it is desirable to provide a check rein hook 20 beneath the crupper loop. This form has the upstanding end 21 projecting above the seat 9 and a bolt 22 which is formed similar to and performs the functions of the shank 9′ hereinbefore described. By providing the central plate, crupper loop, and seat with the similar and registering slot-like apertures, allows the check rein hook to be used either with or without the seat 9 and crupper loop, as will be apparent.

The check rein hook which projects below the crupper loop extends beneath and between the spaced ears 12 and the lugs 15 and is thus held against shifting in a transverse direction. The provision of the various lugs and ears prevents a side stress being exerted upon the various bolts and set screws, thus allowing light screws and bolts to be employed.

Having thus fully described my invention, what I claim is:—

A harness saddle comprising a tree, a seat disposed thereon, a crupper plate disposed below the tree and having a pair of reflexed ears at its side edges and intermediate its ends, the crupper plate also having a pair of forwardly projecting ears at its forward end, the front edge of the tree having a pair of deflexed ears fitting between the said lugs, a check rein plate disposed below the crupper plate and disposed snugly within the said reflexed ears, the front end of the check rein plate fitting between the said deflexed ears and having an upstanding check rein hook, and a securing element engaged through the said plates, tree and seat.

In testimony that I claim the foregoing as my own, I have hereto affixed my signature in the presence of two witnesses.

CHARLES STEINBACH.

Witnesses:
JOHN L. FLETCHER,
HOWARD S. HOLMES.